(12) United States Patent
Mubarek et al.

(10) Patent No.: US 11,566,906 B2
(45) Date of Patent: Jan. 31, 2023

(54) METHOD, APPARATUS, AND SYSTEM FOR GENERATING VEHICLE PATHS IN A LIMITED GRAPH AREA

(71) Applicant: HERE GLOBAL B.V., Eindhoven (NL)

(72) Inventors: Ömer Mubarek, Chicago, IL (US); Colin Watts-Fitzgerald, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 196 days.

(21) Appl. No.: 16/589,965

(22) Filed: Oct. 1, 2019

(65) Prior Publication Data

US 2021/0095975 A1    Apr. 1, 2021

(51) Int. Cl.
   *G01C 21/34*    (2006.01)
(52) U.S. Cl.
   CPC ............................. *G01C 21/3415* (2013.01)
(58) Field of Classification Search
   CPC ................................................. G01C 21/3415
   See application file for complete search history.

(56) References Cited

U.S. PATENT DOCUMENTS

| | | | | |
|---|---|---|---|---|
| 7,526,492 B2* | 4/2009 | Mikuriya | ............... | G01C 21/32 701/454 |
| 8,825,265 B1* | 9/2014 | Ferguson | ............... | B62D 15/00 701/26 |
| 10,488,219 B2* | 11/2019 | Tanizaki | ............ | G01C 21/3688 |
| 2003/0004636 A1* | 1/2003 | Adachi | ............ | G08G 1/096811 701/420 |
| 2006/0276962 A1* | 12/2006 | Yoshioka | ............. | G09B 29/007 701/520 |
| 2011/0313648 A1* | 12/2011 | Newson | ............. | G01C 21/3484 701/447 |
| 2012/0095682 A1* | 4/2012 | Wilson | ................... | G01C 21/32 701/532 |

(Continued)

FOREIGN PATENT DOCUMENTS

WO    20110160681 A1    12/2011

OTHER PUBLICATIONS

European Office Action for related European Patent Application No. 20199454.8-1001 dated Feb. 24, 2021, 8 Pages.

*Primary Examiner* — Dale W Hilgendorf
*Assistant Examiner* — Hana Lee
(74) *Attorney, Agent, or Firm* — Ditthavong, Steiner & Mlotkowski

(57) ABSTRACT

An approach is provided for generating/breaking vehicle paths on a limited graph area. The approach, for example, determining an expected frequency of location data collected from a sensor of a vehicle traveling on a roadway, wherein the location data include a plurality of probe points that are time-sequenced. The approach also involves detecting an exit or an entry of the vehicle on the roadway based on comparing the expected frequency to an observed frequency of the location data on at least one portion of the roadway. The approach further involves initiating an identification, a creation, a breaking, or a combination thereof of a path constructed from the location data based on the detecting of the exit or the entry of the vehicle. The approach further involves providing the path as an output.

20 Claims, 15 Drawing Sheets

(56) References Cited

U.S. PATENT DOCUMENTS

| | | | |
|---|---|---|---|
| 2014/0163872 A1* | 6/2014 | Schilling | G01C 21/3446 |
| | | | 701/527 |
| 2016/0091324 A1* | 3/2016 | Horihata | G08G 1/096811 |
| | | | 701/417 |
| 2016/0146616 A1* | 5/2016 | Ren | G01C 21/165 |
| | | | 701/409 |
| 2016/0146617 A1* | 5/2016 | Macfarlane | H04W 4/029 |
| | | | 701/532 |
| 2017/0309171 A1* | 10/2017 | Zhao | G01S 19/13 |
| 2018/0003516 A1* | 1/2018 | Khasis | G08G 1/207 |
| 2018/0136666 A1* | 5/2018 | Max | G08G 1/0112 |
| 2018/0276988 A1* | 9/2018 | Littlejohn | G08G 1/0116 |
| 2018/0283882 A1* | 10/2018 | He | H04W 4/024 |
| 2018/0292224 A1* | 10/2018 | Brodski | G08G 1/0112 |
| 2019/0120637 A1* | 4/2019 | Achar | G01C 21/3492 |
| 2019/0137289 A1* | 5/2019 | Annamalai | G01C 21/32 |
| 2019/0186927 A1* | 6/2019 | Koponen | G01C 21/30 |
| 2019/0189001 A1 | 6/2019 | Smothers et al. | |

* cited by examiner

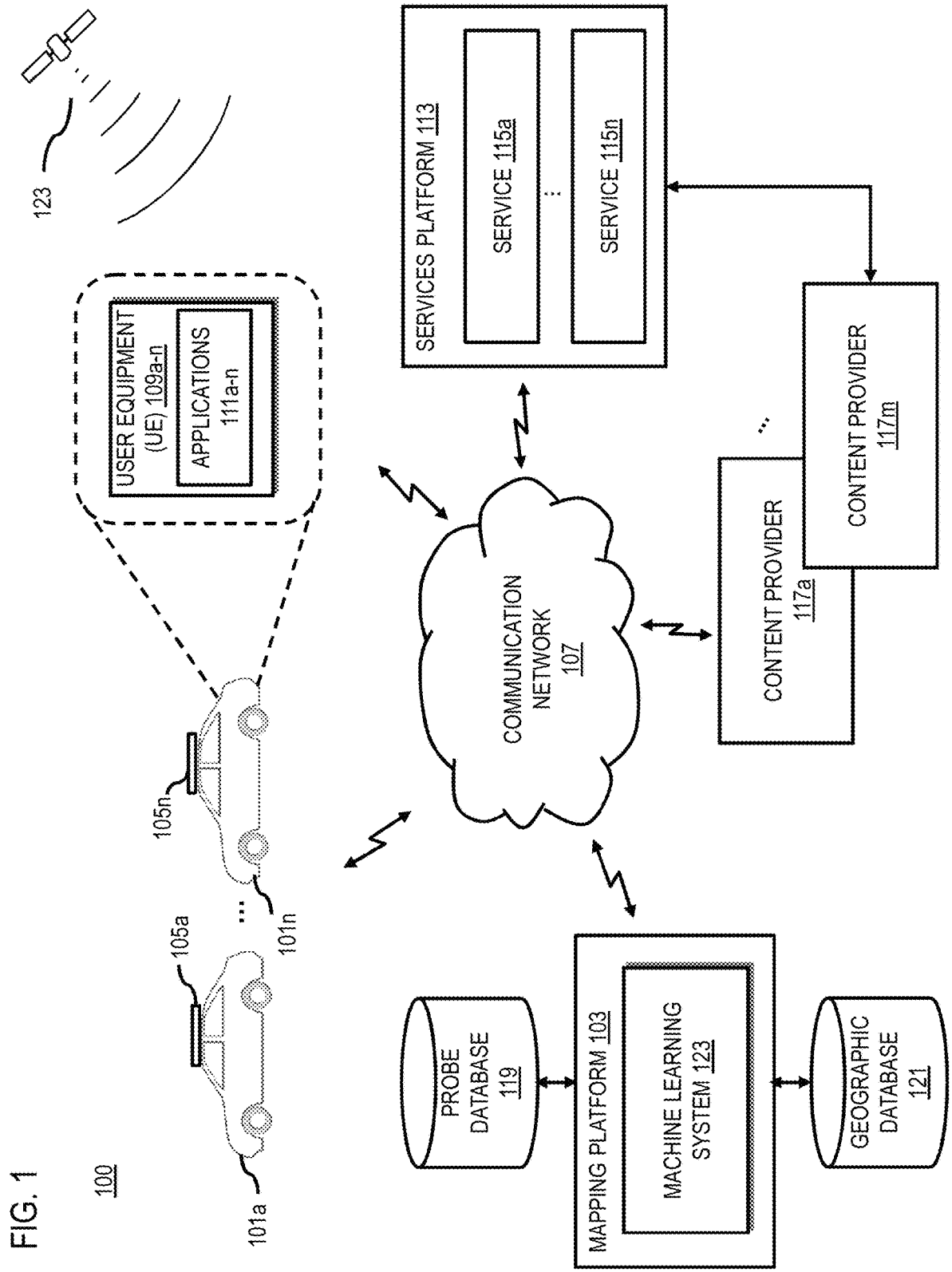

METHOD, APPARATUS, AND SYSTEM FOR GENERATING VEHICLE PATHS IN A LIMITED GRAPH AREA

BACKGROUND

A critical component of navigation and mapping services in today's connected world is accurate, real-time traffic information. For example, highly accurate traffic information can enable service providers to offer users (e.g., commuters) effective trip planning, routing, and/or estimated time of arrival (ETA) services. Vehicle pathing refers to taking data points from vehicles on a road or route and interpolating the path between consecutive points of an individual vehicle. Traffic conditions along that path can then be inferred/interpolated using the distance and travel time between points. However, when the coverage of a roadway graph network is not full, missing vehicle data points can result in the interpolation of trivial or highly unlikely vehicle paths. Consequently, the accuracy of the resulting vehicle paths and inferred traffic conditions is significantly reduced. Accordingly, mapping service providers face significant technical challenges to generate accurate vehicle paths from data on a limited graph network.

SOME EXAMPLE EMBODIMENTS

Therefore, there is a need for generating accurate vehicle paths from data on a limited graph network.

According to one embodiment, a method comprises determining an expected frequency of location data collected from a sensor of a vehicle traveling on a roadway, wherein the location data include a plurality of probe points that are time-sequenced. The method also comprises detecting an exit or an entry of the vehicle on the roadway based on comparing the expected frequency to an observed frequency of the location data on at least one portion of the roadway. The method further comprises initiating an identification, a creation, a breaking, or a combination thereof of a path constructed from the location data based on the detecting of the exit or the entry of the vehicle. The method further comprises providing the path as an output.

According to another embodiment, an apparatus comprises at least one processor, and at least one memory including computer program code for one or more computer programs, the at least one memory and the computer program code configured to, with the at least one processor, cause, at least in part, the apparatus to determine an expected frequency of location data collected from a sensor of a vehicle traveling on a roadway, wherein the location data include a plurality of probe points that are time-sequenced. The apparatus is also caused to detect an exit or an entry of the vehicle on the roadway based on comparing the expected frequency to an observed frequency of the location data on at least one portion of the roadway. The apparatus is further caused to initiate an identification, a creation, a breaking, or a combination thereof of a path constructed from the location data based on the detecting of the exit or the entry of the vehicle. The apparatus is further caused to provide the path as an output.

According to another embodiment, a computer-readable storage medium carries one or more sequences of one or more instructions which, when executed by one or more processors, cause, at least in part, an apparatus to determine an expected frequency of location data collected from a sensor of a vehicle traveling on a roadway, wherein the location data include a plurality of probe points that are time-sequenced. The apparatus is also caused to detecting an exit or an entry of the vehicle on the roadway based on comparing the expected frequency to an observed frequency of the location data on at least one portion of the roadway. The apparatus is further caused to create a break in a path constructed from the location data based on determining that the observed frequency is less than the expected frequency by more than a specified value, wherein the break is created to span the at least one portion of the roadway. The apparatus is further caused to provide the path as an output.

According to another embodiment, an apparatus comprises means for determining an expected frequency of location data collected from a sensor of a vehicle traveling on a roadway, wherein the location data include a plurality of probe points that are time-sequenced. The apparatus also comprises means for detecting an exit or an entry of the vehicle on the roadway based on comparing the expected frequency to an observed frequency of the location data on at least one portion of the roadway. The apparatus further comprises means for initiating an identification, a creation, a breaking, or a combination thereof of a path constructed from the location data based on the detecting of the exit or the entry of the vehicle. The apparatus further comprises means for providing the path as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of generating/breaking vehicle paths on a limited graph area, according to one embodiment;

DESCRIPTION OF SOME EMBODIMENTS

Examples of a method, apparatus, and computer program for generating/breaking vehicle paths on a limited graph area are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of generating/breaking vehicle paths on a limited graph area (road network), according to one embodiment. As mentioned above, a critical component of comprehensive traffic and mapping services in today's connected world is accurate, real-time traffic information. For a variety of traffic services, being able to correctly identify roadway conditions either through speed, incidents, etc. has applicable value, particularly when it can be done inexpensively (i.e., with less data coverage).

Vehicle pathing is a term and technology that refers to taking data points (e.g., global positioning system (GPS) probe data, roadway sensors, car sensors, etc.) from vehicles traveling on a road and interpolating the path between consecutive points of an individual vehicle. By creating this path, the traffic conditions along that path can be inferred/interpolated using the distance and travel time instead of just knowing the traffic conditions at the exact point locations. This strategy can improve traffic-based products through better roadway coverage, accuracy, etc.

However, correctly pathing between two data points of a vehicle can vary widely in difficulty depending on the time between points as well as the accuracy of the data (e.g., due to location sensor accuracy limitations and errors). As the time between data points increases, so does the distance and possible routes/paths between those two points. As such, when the coverage of a graph network is not full, missing vehicle data points can often result in the interpolation of trivial or highly unlikely vehicle paths. Consequently, the likely accuracy of the vehicle path and inferred traffic conditions is significantly reduced.

Figure 2A:
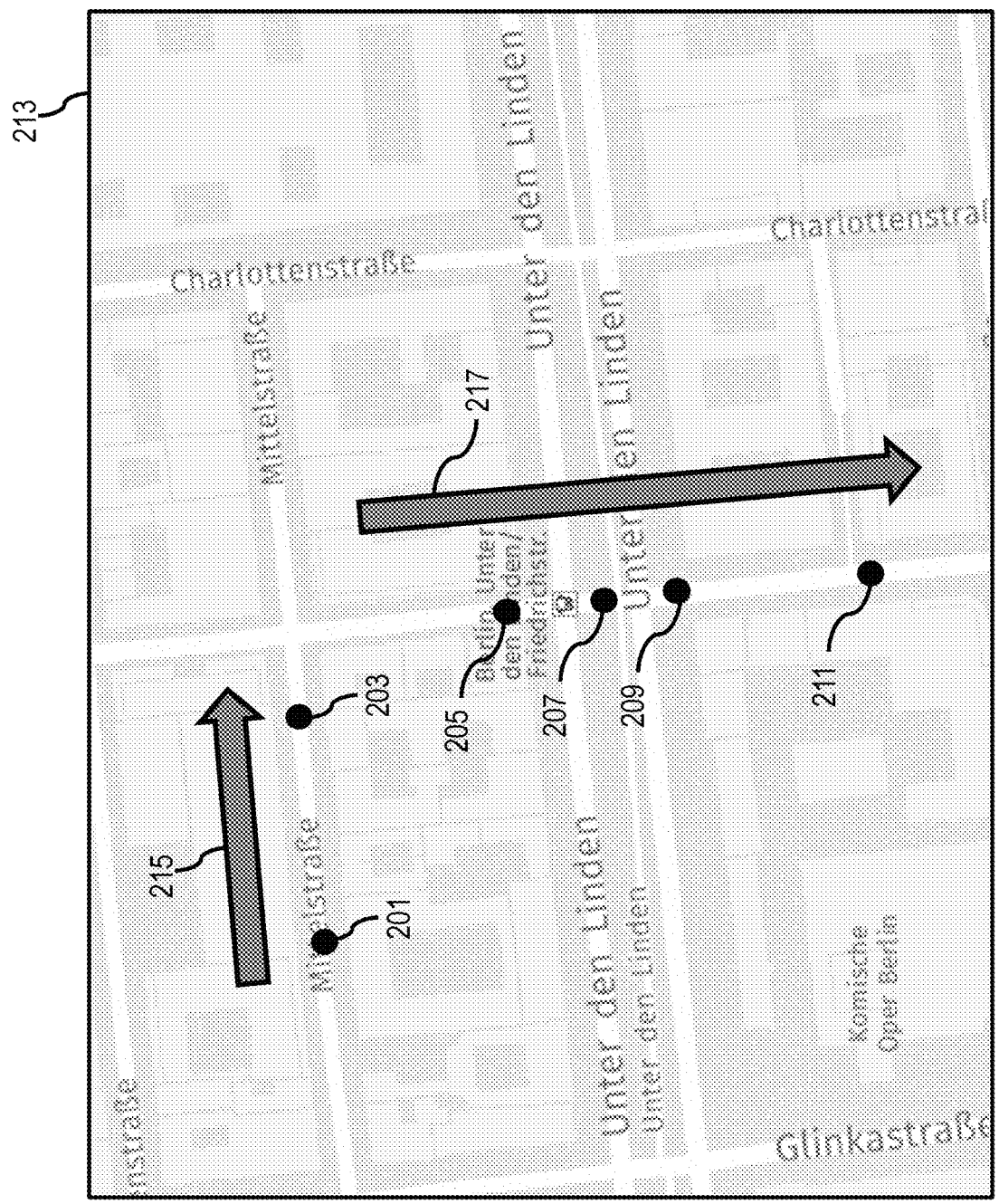
FIGS. 2A and 2B are diagrams of example vehicle probe point frequencies on a road network graph, according to one embodiment.
Figure 2B:
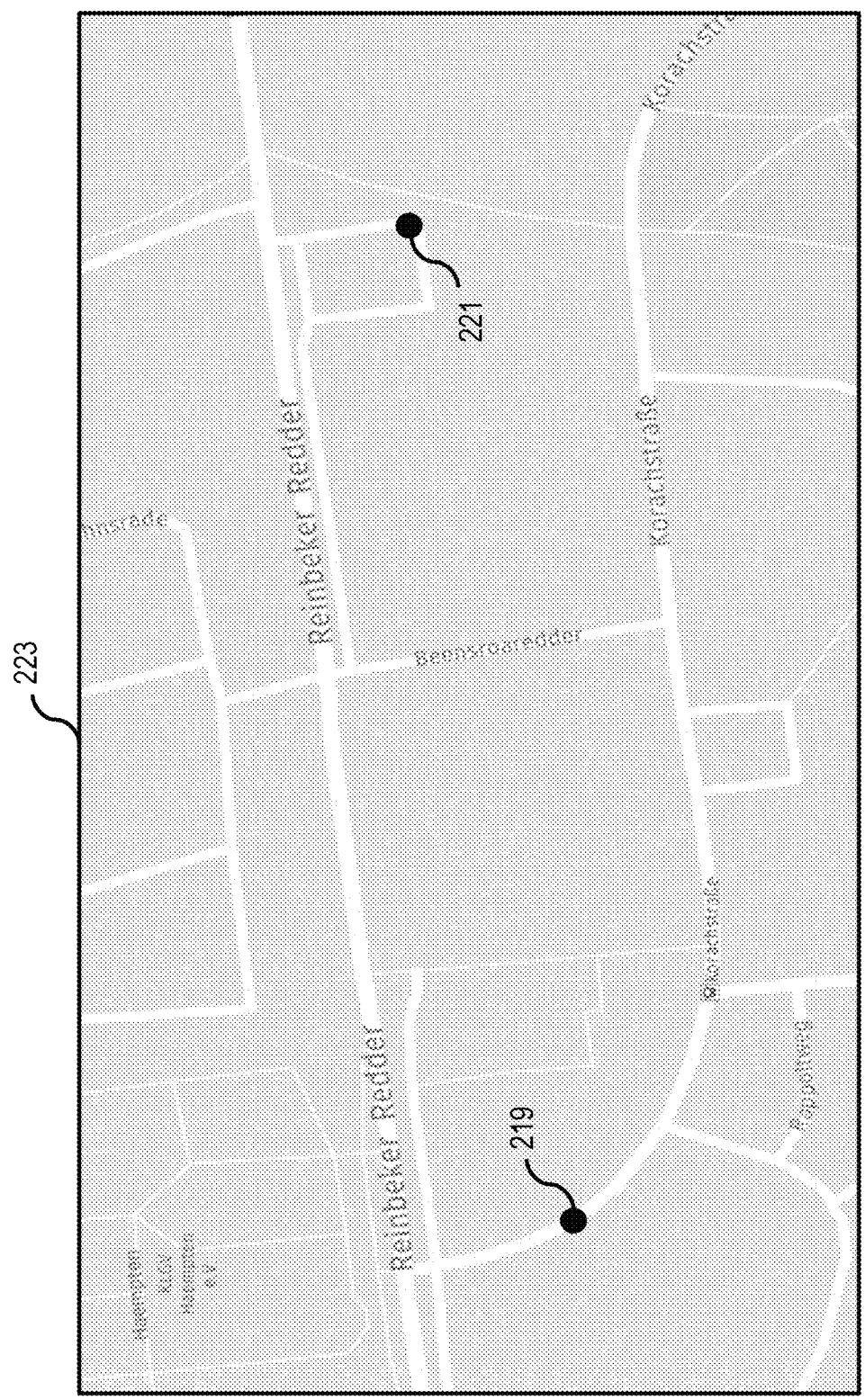

FIGS. 2A and 2B are diagrams of an example vehicle probe point frequencies on a road network graph, according to one embodiment. Referring to FIG. 2A, the vehicle probe points 201, 203, 205, 207, 209, and 211 are detected from one or more vehicles (e.g., on 10 second intervals), along a portion of the roadway network 213. As described above, because the time between probe points is relatively minimal (e.g., 10 seconds), the distance and possible routes/paths between two points (e.g., 201 and 203) is also relatively minimal. Thus, the vehicle path 215 between the points 201 and 203 and the vehicle path 217 between the points 205 and 211 may be interpolated with relative confidence. In contrast, vehicle probe points 219 and 221 of FIG. 2B are detected on a portion of the road network 223 from a vehicle over 60 seconds apart. In this instance, the road network 223 allows multiple feasible paths between the two points making interpolating the correct path with confidence difficult.

There are a variety of algorithms, for example, that may be used to interpolate paths between consecutive points of a vehicle that attempt to solve issues in pathing when multiple paths could have been used between two consecutive vehicle data points (e.g., points 219 and 221). These algorithms can vary in complexity and accuracy, which tends to lead to having to balance between computational costs and accuracy. Higher order (more complex) pathing algorithms typically consider as many as possible (if not all) probe points sent by a vehicle to more likely infer the true path of a vehicle. Some pathing algorithms will even delay pathing a vehicle when a break in the path leads to uncertainty until more probe points make the true path clear. These more complicated algorithms typically provide higher accuracy results but increase the computational cost (which translates to a financial cost) as well as a cost in terms of latency. Simpler pathing algorithms that reduce said costs typically take less data such as a point-based pather which uses just two points at a time and accepts the high risk of inaccuracy.

Figure 3A:
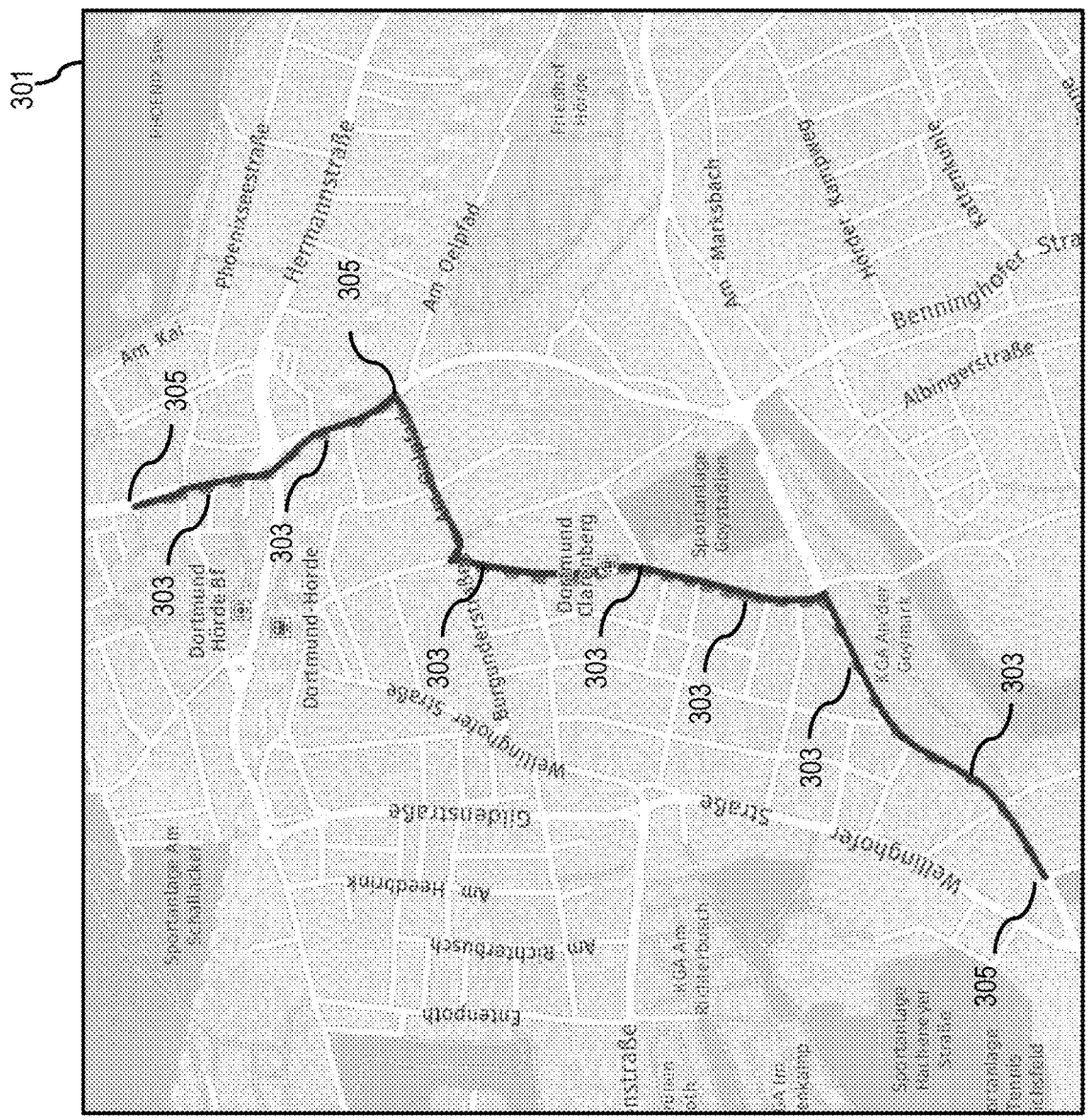
FIGS. 3A through 3C are diagrams of example vehicle pathing on a road network graph, according to one embodiment.
Figure 3B:
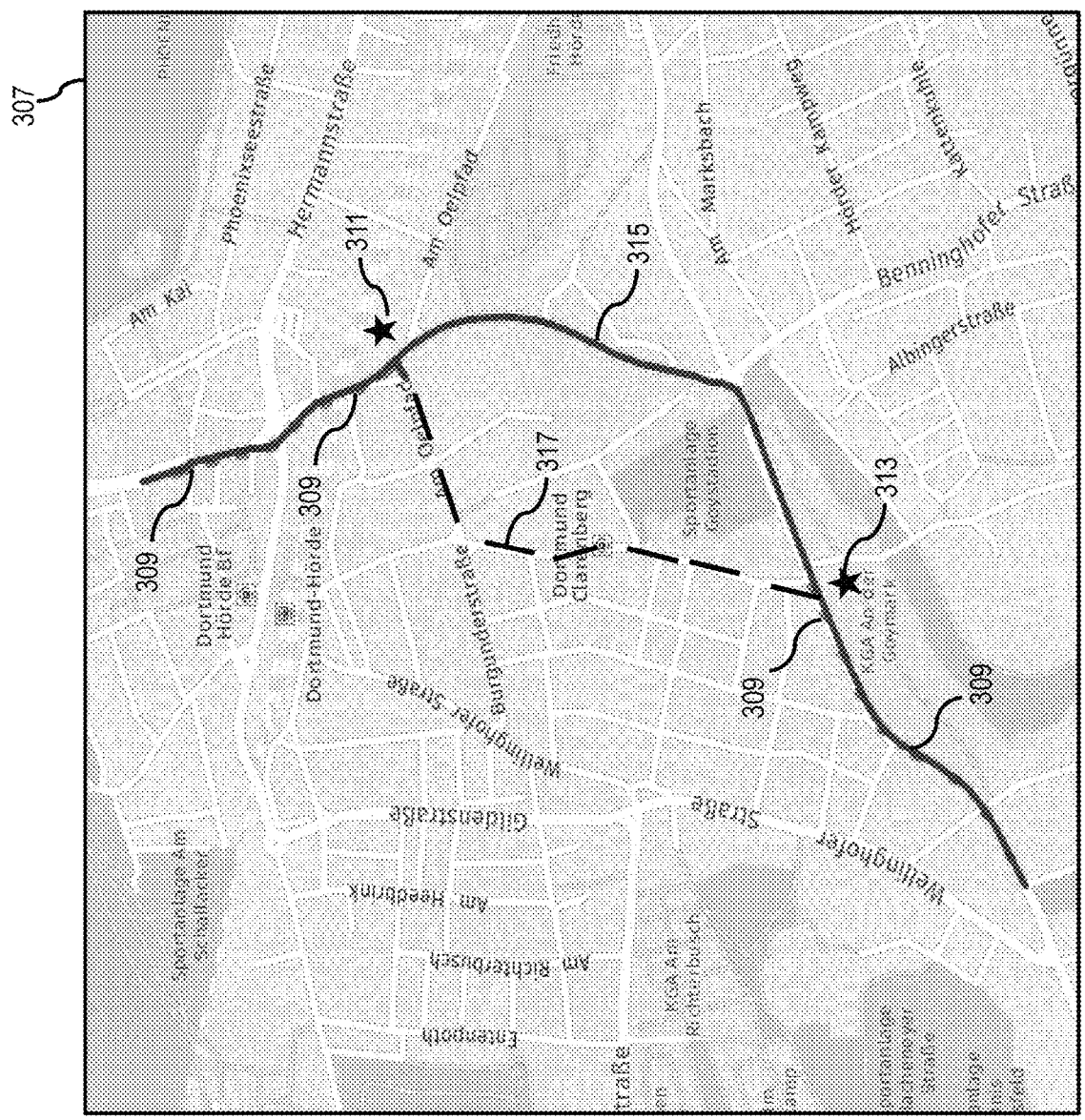
Figure 3C:
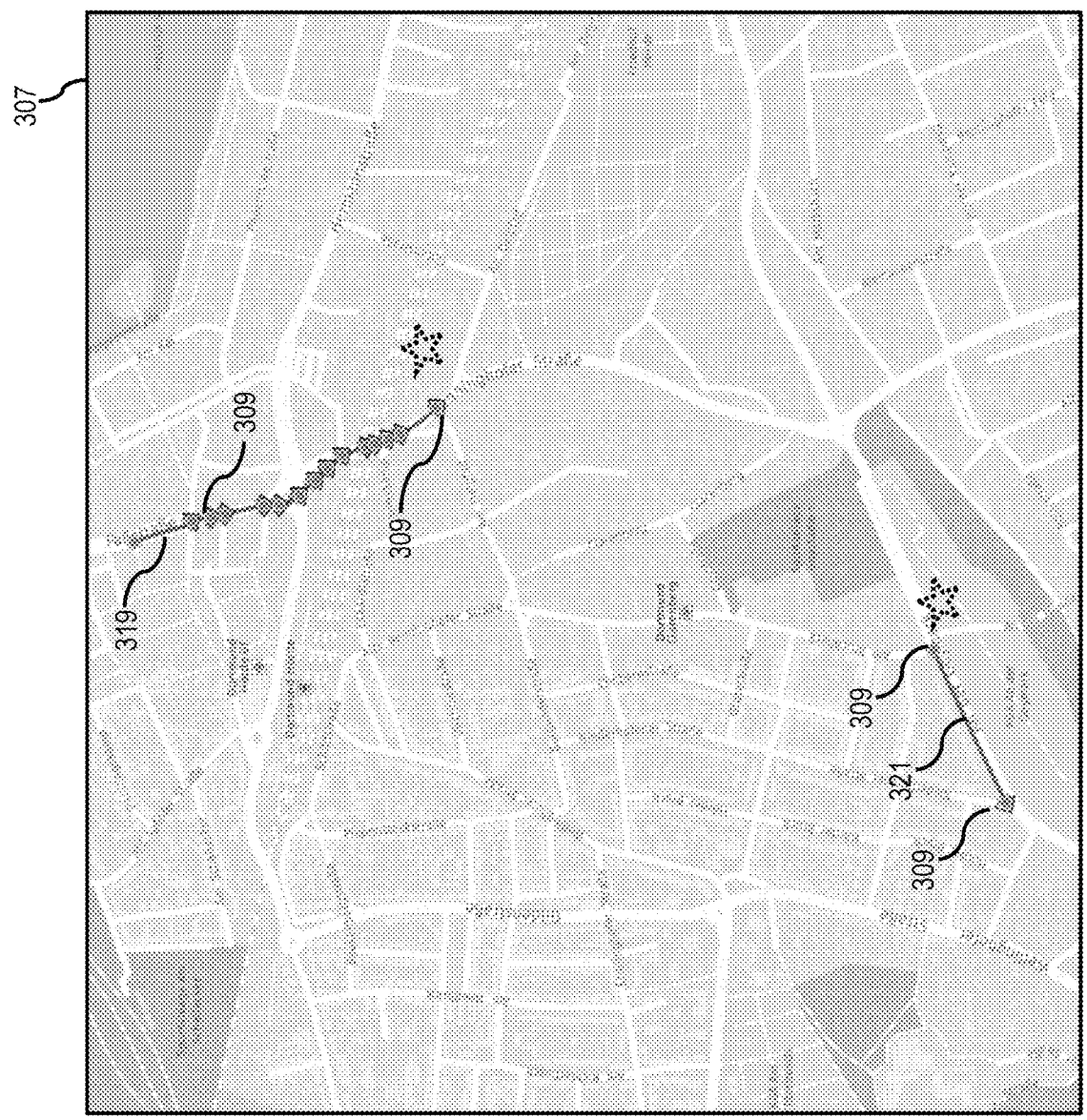

FIGS. 3A through 3C are diagrams of example vehicle pathing on a road network graph, according to one embodiment. Specifically, FIG. 3A is a diagram of example vehicle pathing on a full graph and FIGS. 3B and 3C are diagrams of example vehicle pathing on a limited area graph. As previously stated, most pathing algorithms assume full or near probe coverage of each individual vehicle within the network. Referring to FIG. 3A, in this instance a high frequency vehicle is observed over the full graph 301 (thus all probes 303 from the vehicle are received/tracked). Consequently, the full, correct path 305 is easily discernable and can be created by any number of pathing algorithms with confidence.

However, when the coverage of a graph or road network is not full (e.g., road network 307), this can lead to the erroneous generation of trivial or highly unlikely routes/paths. By way of example, vehicle coverage of a graph or road network might not be full when a system/product is trying to conserve hardware bandwidth/cost (and/or latency) so that the "observed" area is a limited roadway network (e.g., road network 307). For example, in this instance, the probe data or probe points 309 may be detected at consistent short intervals (e.g., every 10 seconds) up until the point represented by the star 311. Thereafter, the probe data may not be detected for a period until the probe points 309 are once again detected at the point represented by the star 313. In this case, the vehicle can enter→exit→enter the observed roadway network 307 many times and these "breaks" in coverage (e.g., between stars 311 and 313) can potentially create wildly incorrect paths. For example, an algorithm may reasonably generate the path 315 based on the detected probe points 309. However, the true vehicle path is path 317. In such cases, users of a traffic service that rely on problematic data can suffer from unexpected delays, reroutes, etc. As a result, users may gradually lose their trust in the service if such events occur frequently.

To minimize this risk, traffic service providers have traditionally deployed human resources to monitor traffic conditions from multiple sources and to report incidents accurately. However, human or manual monitoring and verification can be resource intensive and may not scale well. For example, as the number of detour events increase (e.g., with increased coverage area), so does the labor cost and chances for human errors. Accordingly, mapping service providers face significant technical challenges to generate/curate accurate vehicle paths from data on a limited graph network with confidence.

To address these problems, the system 100 of FIG. 1 introduces a capability to identify, create, or break alternate vehicle paths using any pathing algorithm on a limited graph network by detecting and understanding the expected frequency of data from individual vehicles. Then, using the expected frequency, detect when a vehicle has potentially exited the limited graph. In one embodiment, the system 100 makes one or more path adjustments based on the detection of the vehicle "leaving" the limited roadway network. In one instance, these path adjustments include (but are not limited to) prioritizing/deprioritizing paths in consideration and/or creating/breaking paths when appropriate. An example would be to path the vehicle in question up to the point of detection (star 311), break the false path 315 between the stars 311 and 313, and then create a new path after the star 313.

In one embodiment, the system 100 uses the frequency of data points collected from any source (e.g., probes, sensors, etc.) as well as the road graph (in purview) to detect/identify that one or more vehicles 101a-101n (also collectively referred to as vehicles 101) (e.g., standard vehicles, autonomous vehicles, heavily assisted driving (HAD) vehicles, semi-autonomous vehicles, etc.) has likely left the roadway graph and to use this information to inform the pathing algorithms (e.g., the mapping platform 103). In one embodiment, the vehicles 101 have one or more vehicle sensors 105a-105n (also collectively referred to as vehicle sensors 105) (e.g., Light Detection and Ranging (LiDAR), global positioning system (GPS), camera sensor, etc.) and have connectivity to the traffic platform 103 via the communication network 107. In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can also collect data points from one or more user equipment (UE) 109a-109n (also collectively referenced to herein as UEs 109) associated with the a vehicle 101 (e.g., an embedded navigation system), a user or a passenger of a vehicle 101 (e.g., a mobile device, a smartphone, etc.), or a combination thereof. In one instance, the UEs 109 may include one or more applications 111a-111n (also collectively referred to herein as applications 111) (e.g., a navigation or mapping application). In one instance, the system 100 may also collect the probe data and/or sensor data from one or more other sources such as government/municipality agencies, local or community agencies (e.g., police departments), and/or third-party official/semi-official sources (e.g., a services platform 113, one or more services 115a-115n, one or more content providers 117a-117m, etc.). In one embodiment, the probe data and/or sensor data collected by the vehicle sensors 105, the UEs 109, one or more other sources, or a combination thereof may be stored in the probe database 119, the geographic database 121, or a combination thereof.

In one embodiment, by monitoring the frequency (time between data points) and calculating an expected frequency time, the system 100 can determine when to expect the next data point from a vehicle 101. Should the vehicle/data source go off the limited road network, the data point will not be captured by the system 100 and thus no data points from that vehicle 101 will either appear again or will appear again at an unknown amount of frequency cycles down the road (should the vehicle 101 come back onto the graph). By monitoring and creating an expected frequency, the system 100 can determine that a vehicle 101 has likely left the roadway/detoured which can then be used to break paths that might be created "on" the limited roadway graph (i.e., false or likely inaccurate paths). Instead, paths that are "on" the limited roadway graph can be broken or removed from being considered by a pathing algorithm (e.g., the mapping platform 103). In some cases, the system 100 can also create or prioritize other paths (e.g., based on an assignment of weights, correlations, relationships, etc.).

In one instance, over the course of a vehicle 101's dataset (with only data from the limited roadway graph), the system 100 can take the time difference between the first series of data points (e.g., at 5 second intervals) and continue calculating with each subsequence point what the expected frequency should be (e.g., 5 second intervals). In one embodiment, the system 100 can employ any one of several different calculations such as median, average, etc. to determine this expected frequency. For example, the data points 309 of FIG. 3B are data points with a 5 second frequency between each point. At the point of the star 311, the vehicle 101 likely left the limited roadway graph 307 and eventually rejoined the limited roadway graph 307 at the star 313. When the vehicle 101 frequency of 5 seconds does not show up on the limited graph 307 for enough iterations (i.e., within a certain period of time), the system 100 detects that the vehicle has likely left the roadway graph 307 (e.g., as a result of a detour event such as a road closure) and no paths should be generated on the limited roadway graph 307 (up until that point). In one embodiment, if the system 100 detects more data from that vehicle down the road (e.g., after star 313), the system 100 can cut the path between the gap (e.g., between stars 311 and 313) and then generate new paths separately. In other words, the system 100 would break the path 315 between the stars 311 and 331 and remove it from path consideration (e.g., by the mapping platform 103).

In one embodiment, by monitoring the frequency (time between data points) and calculating an expected frequency time, the system 100 can also generate one or more features for machine learning algorithm solutions (e.g., the machine learning system 123) based off of these detections (such as a "detouring vehicle" feature). For example, this can be a useful addition to machine learning algorithms that are trying to detect road closures and verify their locations. A traditional algorithm monitoring a potential closure will likely not have full knowledge of the surrounding area (vehicle/probe data) and due to this, the pathing needs to appropriately recognize that a vehicle 101 has left the graph 307 (and potentially returned) to identify detouring vehicles 101. Based on the embodiments implemented in this case, the final path sets would be the paths 319 and 321 depicted in FIG. 3C.

Figure 4:
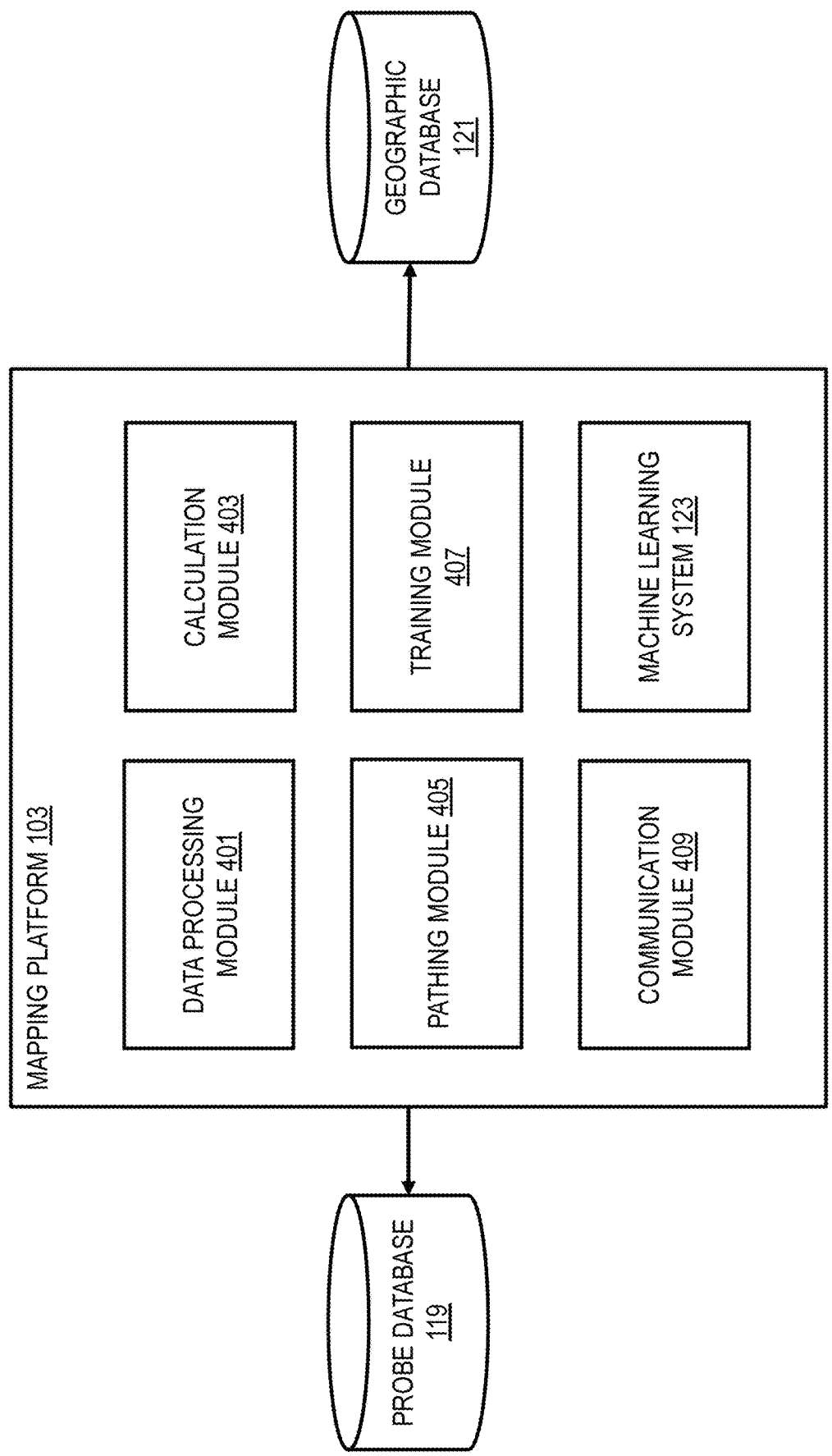
FIG. 4 is a diagram of components of a mapping platform capable of generating/breaking vehicle paths from data on a limited graph area, according to one embodiment.

FIG. 4 is a diagram of the components of the mapping platform 103, according to one embodiment. By way of example, the mapping platform 103 includes one or more components for generating/breaking vehicle paths on a limited graph area, according to the various embodiments described herein. It is contemplated that the functions of these components may be combined or performed by other components of equivalent functionality. In one embodiment, the mapping platform 103 includes a data processing module 401, a calculation module 403, a pathing module 405, a training module 407, a communication module 409, and the machine learning system 123, and has connectivity to the probe database 119 and the geographic database 121. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100. In another embodiment, the mapping platform 103 and/or the modules 401-409 may be implemented as a cloud-based service, local service, native application, or combination thereof. The functions of the mapping platform 103, the machine learning system 123, and/or the modules 401-409 are discussed with respect to FIG. 5.

Figure 5:
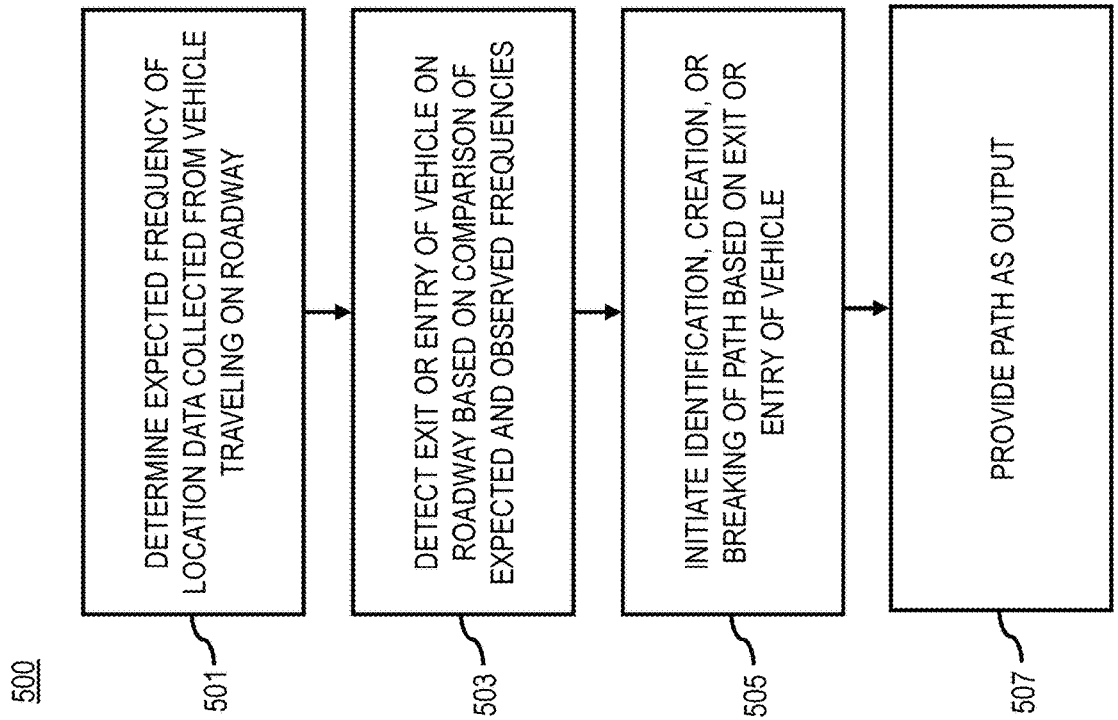
FIG. 5 is a flowchart of a process for generating/breaking vehicle paths on a limited graph area, according to one embodiment.
Figure 9:
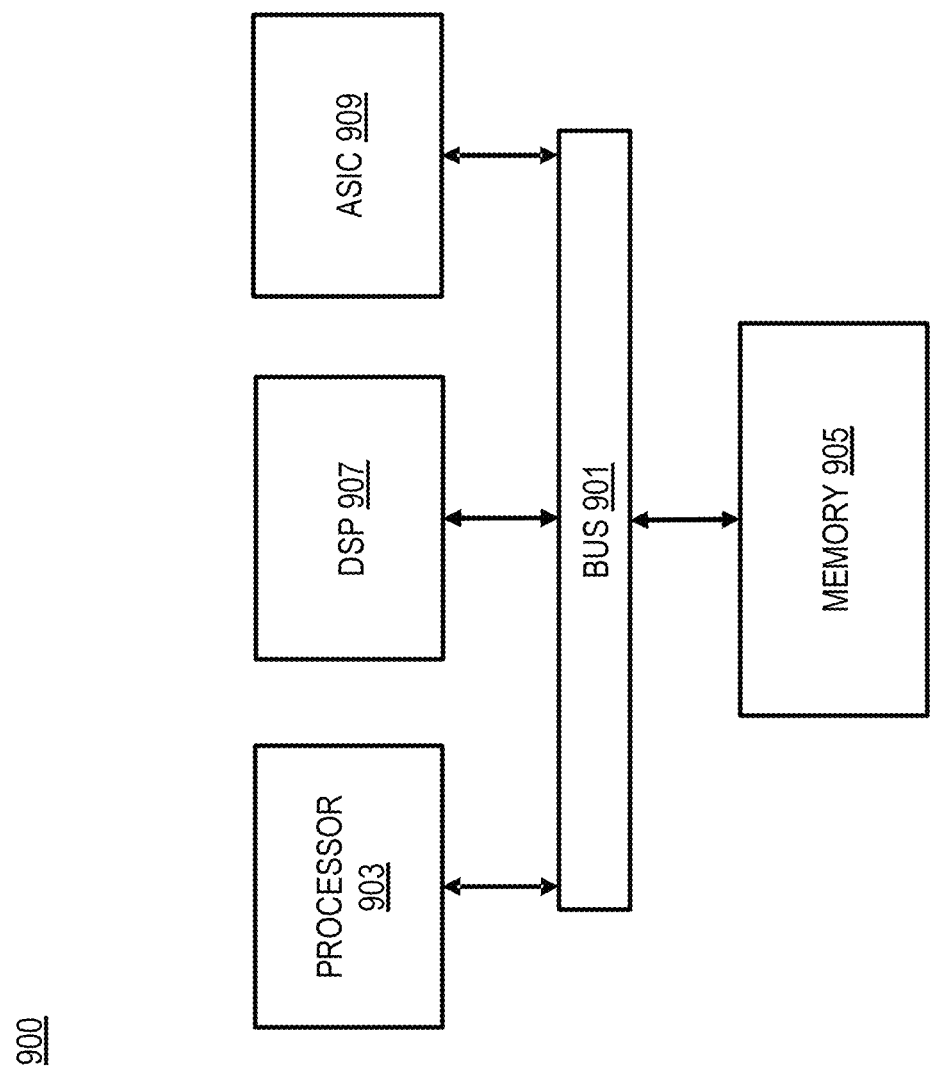
FIG. 9 is a diagram of a chip set that can be used to implement an embodiment.

FIG. 5 is a flowchart of a process for generating/breaking vehicle paths on a limited graph area, according to one embodiment. In various embodiments, the mapping platform 103, the machine learning system 123, and/or any of the modules 401-409 may perform one or more portions of the process 500 and may be implemented in, for instance, a chip set including a processor and a memory as shown in FIG. 9. As such, the mapping platform 103, the machine learning system 123, and/or the modules 401-409 can provide means for accomplishing various parts of the process 500, as well as means for accomplishing embodiments of other processes described herein in conjunction with other components of the system 100. Although the process 500 is illustrated and described as a sequence of steps, its contemplated that various embodiments of the process 500 may be performed in any order or combination and need not include all the illustrated steps.

In step 501, the data processing module 401 determines an expected frequency of location data collected from a sensor of a vehicle traveling on a roadway, wherein the location data include a plurality of probe points that are time sequenced. In one embodiment, the expected frequency is based on an estimated frequency of a designated portion of the plurality probe points. In other words, the expected and/or estimated frequency is at or about what the frequency should be on the roadway (e.g., based on a historical baseline or reference model for that road segment). In one instance, the estimated frequency may be based on a median, average, etc. time between available data points of a same or similar vehicle (e.g., a vehicle 101) traveling on the roadway of interest under the same or similar temporal and/or contextual conditions (e.g., time, weather, etc.). In one embodiment, the estimated frequency may be based on free flow traffic and/or historic traffic flow on the roadway under the same or similar conditions.

In one embodiment, each vehicle 101 can be configured to report location data (e.g., probe data and/or sensor data) via a vehicle sensor 105, a UE 109, or a combination thereof as probe points, which are individual data records collected at a point in time that records telemetry data for the vehicle 101 for that point in time. By way of example, a vehicle sensor 105 may include a RADAR system, a LiDAR system, a global positioning sensor for gathering location data (e.g., GPS), etc. In one embodiment, a probe point may include the following five attributes (by way of illustration and not limitation): (1) probe ID; (2) longitude; (3) latitude; (4) speed; and (5) time. In one embodiment, the data processing module 401 can split the plurality of probe points per vehicle 101 based on the unique probe IDs to represent the travel trajectory or vehicle path (e.g., speed and heading) of each vehicle 101. In one instance, the location data (e.g., probe data, sensor data, or a combination thereof) collected by the data processing module 401 from the vehicle sensors 105, the UEs 109, or a combination thereof may be stored in or accessed via the probe database 119, the geographic database 121, or a combination thereof.

In step 503, the calculation module 403 detects an exit or an entry of a vehicle 101 on the roadway based on comparing the expected frequency to an observed frequency of the location data on at least one portion of the roadway (e.g., the roadway that the vehicle 101 is traveling on). By way of example, the exit or entry of the vehicle 101 may comprise a detour from the roadway within the road network graph (e.g., based on a road closure, a traffic incident or accident, etc.). In one instance, the observed frequency is determined from location data collected from a sensor of a vehicle 101 (e.g., a sensor 105, a UE 109, or a combination thereof) traveling on the roadway of interest. In one embodiment, the calculation module 403 determines or detects that the vehicle 101 has exited the roadway for the at least one portion of the roadway (e.g., during the detour) based on determining that the observed frequency is less than the expected frequency by more than a specified value.

In one embodiment, the calculation module 403 can determine the existence of any differences (e.g., less than or greater than) or anomalies between the expected frequency and the observed frequency for a road or route using a function of the estimated frequency and the map data, statistical analysis, machine learning (e.g., using the machine learning system 123), or a combination thereof. In one instance, the specified value may be based on one or more statistical or probability models that describe the historic and/or the observed probe activity distribution (e.g., probe count distribution) for the roadway. In other words, the calculation module 403 can use any suitable statistic or discrete probability distribution to determine the odds or the likelihood of the observed frequency relative to the expected frequency such as but not limited to a Poisson distribution, a Gaussian approximation of the Poisson distribution or an equivalent to determine the specified value (threshold) suggesting that a vehicle 101 likely exited the roadway.

In one embodiment, the calculation module 403 determines that the vehicle has entered or re-entered the roadway for at least one portion of the roadway based on determining that the observed frequency is equal to the expected frequency within a specified margin. By way of example, the specified margin, like the specified value, may be based on one or more statistical or probability models that describe the historic and/or the observed probe activity distribution (e.g., probe count distribution) for the roadway. In the example described above with respect to FIG. 3B, the calculation module 403 can determine that the vehicle entered or re-entered the roadway when the data processing module 401 detects location data (e.g., probe points 309) at or about 5 second intervals (e.g., after the star 313).

In step 505, the pathing module 405 initiates an identification, a creation, a breaking, or a combination thereof of a path constructed from the location data based on the detecting of the exit or the entry of the vehicle. In one embodiment, the path indicates one or more road segments of the roadway predicted to have been traveled by the vehicle. By way of example, as described above, the prediction of the vehicle path may be based on interpolating the path between consecutive data points of an individual vehicle traveling on the roadway.

In one embodiment, the pathing module 405 in connection with the calculation module 403 creates a break in the path based on determining that the observed frequency is less than the expected frequency by more than a specified value, wherein the break is created to span the at least one portion of the roadway. By way of example, the pathing module 405 can break the path between where the calculation module 403 determines that the vehicle exited the roadway (e.g., after the star 311) and where the calculation module 403 determines that the vehicle has entered or re-entered the roadway (e.g., after the star 313). In one instance, the broken path represents a false path or at least a trivial or highly unlikely vehicle path (e.g., path 315). In one embodiment, the pathing module 405 constructs a new path based on the location data occurring after the break (e.g., path 321).

In one embodiment, the machine learning system 123 can determine or predict that the vehicle 101 has taken a detour, that a road segment of the roadway has been closed, or a combination thereof based on the break. In one embodiment, the training module 407 can train or condition the machine learning system 123 using features or inputs corresponding to when vehicles detour/leave the graph and/or the resulting broken paths. By way of example, the training module 407 can train the machine learning system 123 to identify roadway behavior (e.g., detours, closures, accidents, etc.) by assigning weights, correlations, relationships, etc. among the features/flags corresponding to when vehicles detour/leave the graph. In one embodiment, the training module 407 can continuously provide and/or update a machine learning model (e.g., a support vector machine (SVM), neural network, decision tree, etc.) of the machine learning system 123 during training using, for instance, supervised deep convolution networks or equivalents. In other words, the training module 407 trains a machine learning model using the various inputs to enable the machine learning system 123 to automatically compare the broken paths to marked or labeled exit or entry points (e.g., marked or labeled by a human) and/or ground truth data (e.g., human-created observations).

In one embodiment, the pathing module 405 removes the one or more road segments comprising the at least one portion of the roadway from consideration to construct the path (e.g., paths 319 and 321). In other words, the pathing module 405 removes the portion of the roadway between when the calculation module 403 determines that the vehicle has exited the roadway (e.g., after star 311) and when the calculation module 403 determines that the vehicle entered or re-entered the roadway (e.g., after star 313). In one embodiment, the pathing module 405 constructs the path to span the at least one portion of the roadway (i.e., the one or more road segments corresponding to the incorrect path 315).

In step 507, the communication module 409 provides the path as an output. By way of example, the communication module 409 may provide the output to a vehicle 101, a user of the vehicle 101 (e.g., a driver or a passenger), or a combination thereof via a UE 109 (e.g., an embedded navigation system, a mobile device, etc.) and/or an application 111 (e.g., a navigation application) running on the UE 109. For example, a user of a vehicle 101 can receive a notification via a navigation or mapping application 111 to avoid a road segment based on a determination of a road closure or traffic slowdown or stop event ahead on the road.

Figure 6A:
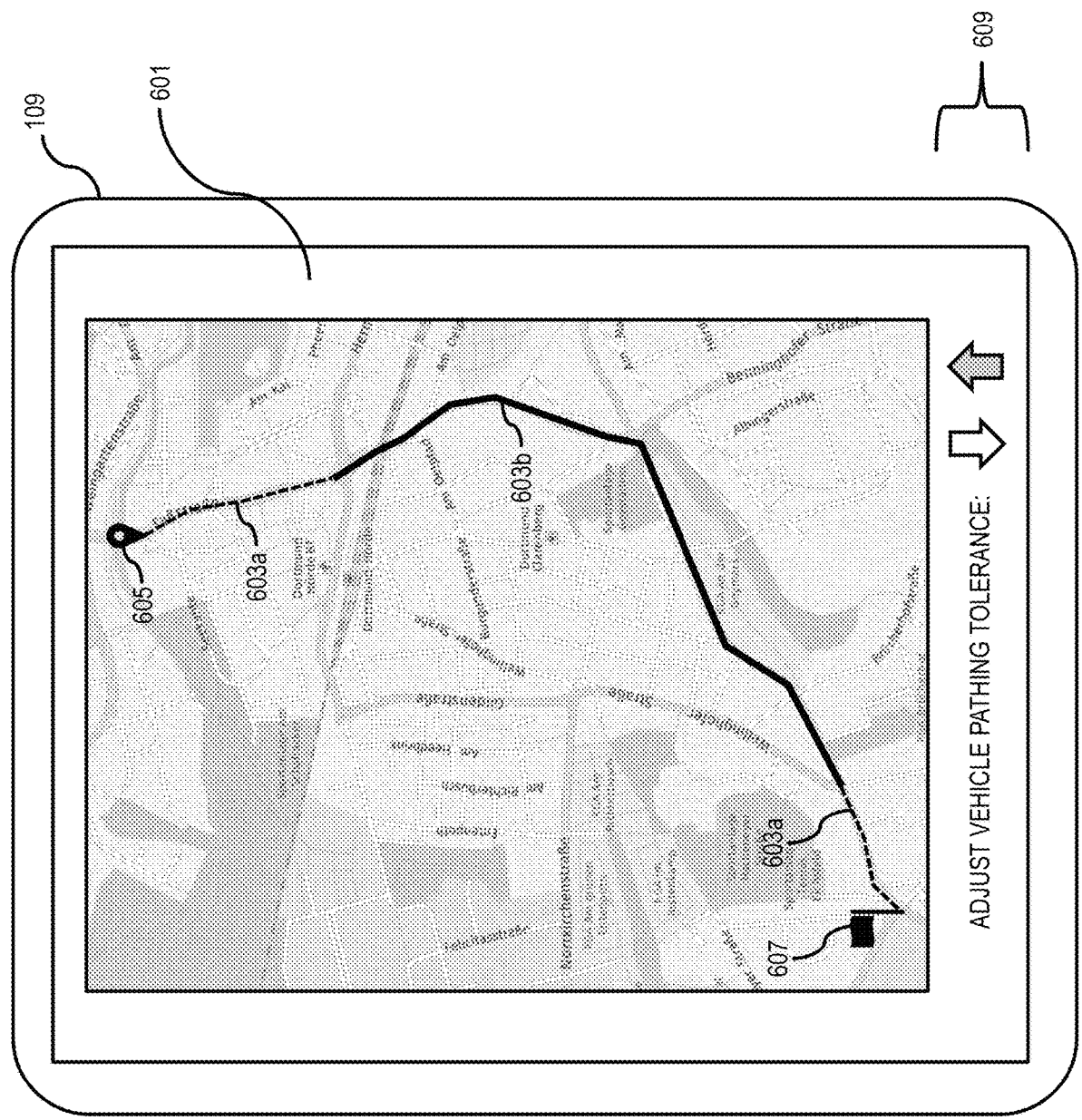
FIGS. 6A-6C are diagrams of example user interfaces for capable of generating/breaking vehicle paths from data on a limited graph area, according to one embodiment.
Figure 6B:
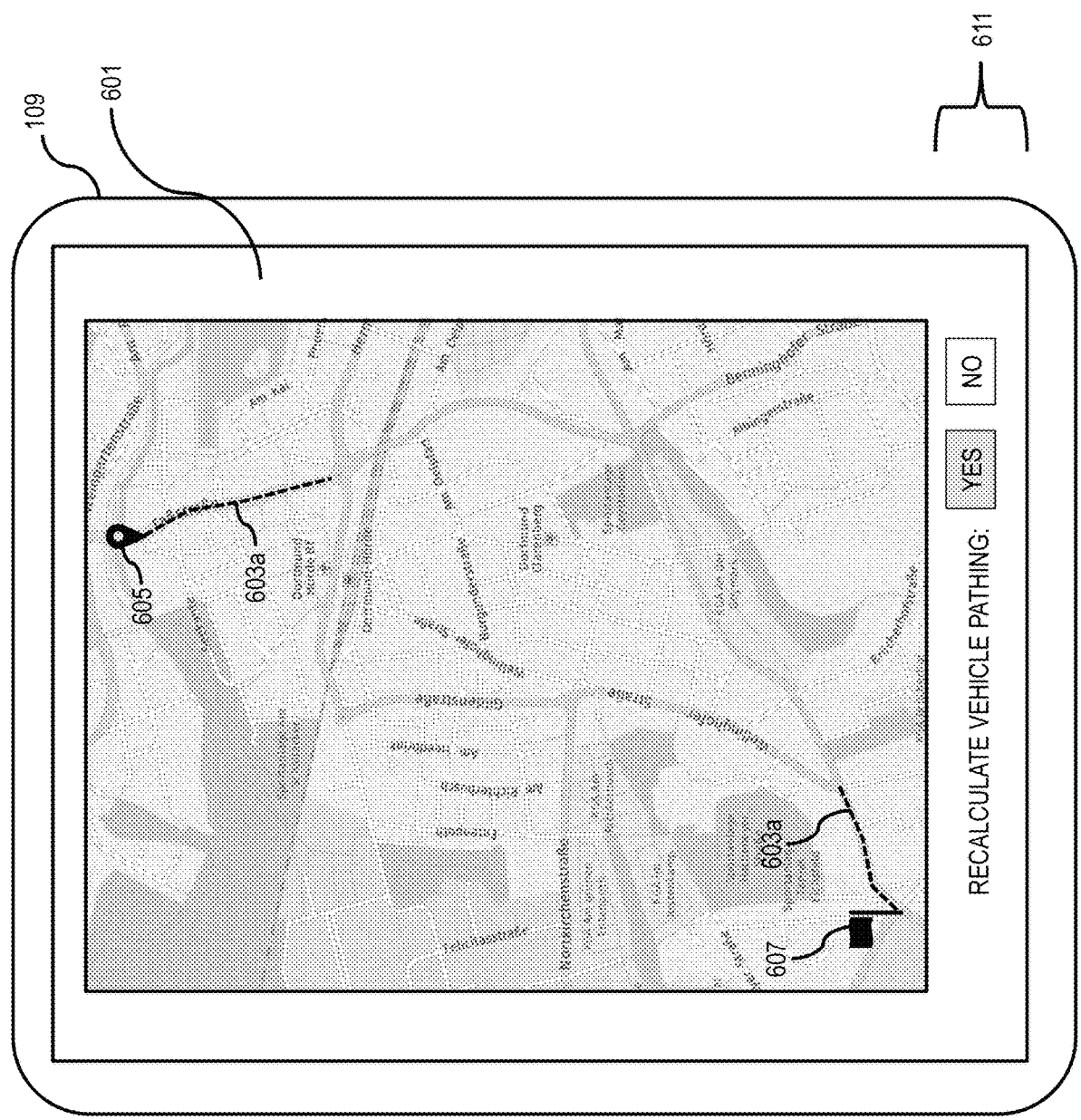
Figure 6C:
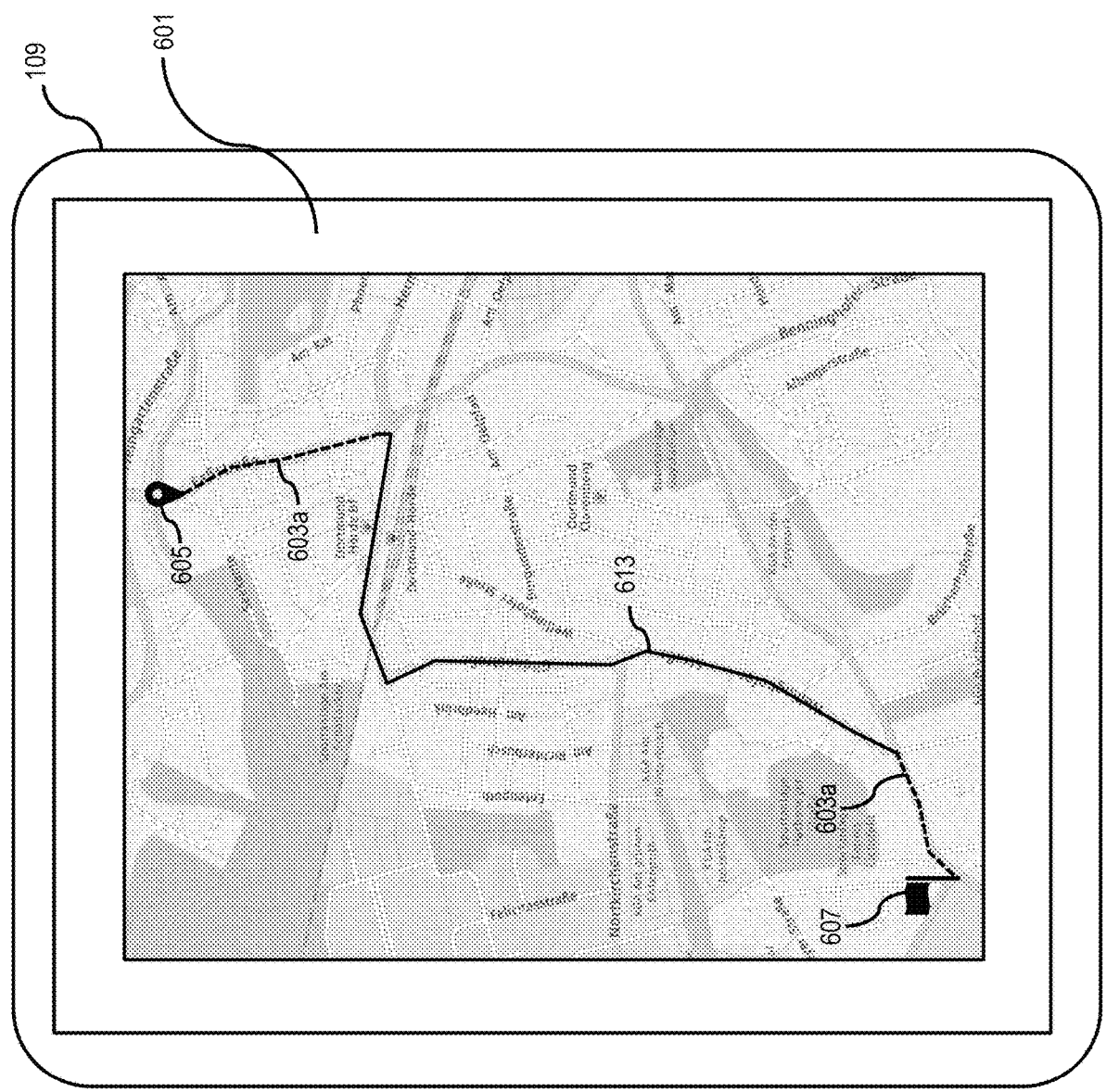

FIGS. 6A-6C are diagrams of example user interfaces for generating/breaking vehicle paths on a limited graph area, according to one embodiment. In this example, a UI 601 (e.g., a navigation application 111) is generated for a UE 109 (e.g., a mobile device, an embedded navigation system, etc.) that can assist a user (e.g., a driver or a passenger) of a vehicle 101 (e.g., an autonomous or semi-autonomous vehicle) to decide whether a navigation or guidance update is required to avoid unnecessary delay (e.g., a road closure, traffic accident, etc.).

Referring to FIG. 6A, a navigation route 603 is provided by the system 100 between a user's current location 605 and the user's desired destination 607. In this instance, the system 100 can render portions of the path 603 (e.g., segments 603a and 603b) based on the frequency of detected data points. In one embodiment, the system 100 detects that the frequency of the segment 603a is within a threshold of an expected frequency (e.g., representing free flowing traffic) and that the frequency of 603b is less than the expected frequency by some threshold or specified value. In one instance, the system 100 may render the segments 603a as green and the segment 603b as red or yellow to visually represent the disparate probe point frequencies and/or rates of travel of a vehicle 101 on the road network.

In one embodiment, the system 100 can generate the UI 601 with inputs 609 (e.g., arrows) such that a user can adjust (e.g., increase or decrease) the threshold or specified value between the observed frequency and the expected frequency of a vehicle 101 on the road network used to determine whether a vehicle has likely left the limited road network (e.g., as a result of road closure, traffic incident, etc.). In one instance, the inputs 609 could also enable a user to increase or decrease the amount of time or iterations that the system 100 waits to see whether the vehicle 101 reappears on the limited graph at or about the frequency detected before the vehicle 101 likely left the road or graph. In one embodiment, the user can interact with the inputs 609 via one or more physical interactions (e.g., a touch, a tap, a gesture, typing, etc.), one or more voice commands (e.g., "increase," "decrease," etc.), or a combination thereof.

As described above, a typical situation where a vehicle coverage might not be full would be in a scenario where the system 100 is trying to conserve hardware bandwidth/cost (and/or latency) so that the "observed" area is a limited roadway network. However, when the coverage of the graph is not full, missing probes of a vehicle 101 can lead the system 100 to erroneously choosing trivial or highly unlikely routes/paths. Thus, a user can interact with the inputs 609 to adjust the system 100's balance between computational cost and accuracy of the vehicle pathing. By way of example, when time is of the essence (e.g., in an emergency response context), the user may want to increase the tolerance to ensure the most accurate vehicle pathing possible irrespective of the computational costs. Likewise, a user may want to adjust the tolerance using the inputs 609 based on one or more contextual and/or temporal parameters. For example, there are generally more probe points available for detection during the day and less probe points available for detection during the middle of the night. As such, a user can adjust the inputs 609 accordingly.

Referring to for FIG. 6B, in one embodiment, based on the user's interaction with the inputs 609 (e.g., increasing the tolerance), the system 100 can break the vehicle pathing between sections 603a and 603b and remove the path 603b from being further considered by a pathing algorithm (e.g., the mapping platform 103). In another instance, the system 100 may break the vehicle pathing between sections 603a and 603b but simply deprioritize the path 603b for future consideration rather than removing the path.

In one embodiment, the system 100 can generate the UI 601 such that it includes inputs 611 to enable a user to prompt the system 100 to recalculate or to create a new path with little or no consideration of the path 603b (e.g., by removing the path 603b from consideration or by deprioritizing the path relative to other possibilities). Referring to FIG. 6C, in this instance, the user has interacted with the inputs 611 such that the system 100 is prompted to recalculate a new path 613 based on the tolerance and/or level of confidence set in FIG. 6A.

Returning to FIG. 1, in one embodiment, the mapping platform 103 performs the process for generating/breaking vehicle paths on a limited graph area as discussed with respect to the various embodiments described herein. For example, the mapping platform 103 can break incorrect paths due to the detection of a vehicle 101 leaving the roadway graph and can generate features for machine learning algorithm solutions.

In one embodiment, the machine learning system 123 of the mapping platform 103 includes a neural network or other machine learning system to compare vehicle path break points to detect road closures and verify their locations. For example, when the inputs are features/flags representing when and where vehicles detour/leave a graph, the output can include an identification or a suggestion of a detour feature on the road (e.g., a road closure, traffic incident, etc.). In one embodiment, the neural network of the machine learning system 123 is a traditional convolutional neural network which consists of multiple layers of collections of one or more neurons (which are configured to process a portion of an input data). In one embodiment, the machine learning system 123 also has connectivity or access over the communication network 107 to the probe database 119 and the geographic database 121 that can each store probe data, labeled or marked features (e.g., "detour" features), etc.

In one embodiment, the mapping platform 103 has connectivity over the communications network 107 to the services platform 113 (e.g., an OEM platform) that provides the services 115a-115n (also collectively referred to herein as services 115) (e.g., probe and/or sensor data collection services). By way of example, the services 115 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 113 uses the output (e.g. generated/broken vehicle paths) of the mapping platform 103 to provide services such as navigation, mapping, other location-based services, etc.

In one embodiment, the mapping platform 103 may be a platform with multiple interconnected components. The mapping platform 103 may include multiple servers, intelligent networking devices, computing devices, components and corresponding software for providing parametric representations of lane lines. In addition, it is noted that the mapping platform 103 may be a separate entity of the system 100, a part of the services platform 113, a part of the one or more services 115, or included within a vehicle 101 (e.g., an embedded navigation system).

In one embodiment, content providers 117 may provide content or data (e.g., including probe data, sensor data, etc.) to the mapping platform 103, the UEs 109, the applications 111, the services platform 113, the services 115, the probe database 119, the geographic database 121, and the vehicles 101. The content provided may be any type of content, such as map content, textual content, audio content, video content, image content, etc. In one embodiment, the content providers 117 may provide content regarding the expected frequency from a vehicle on the digital map or link as well as content that may aid in localizing a vehicle path or trajectory on a digital map or link. In one embodiment, the content providers 117 may also store content associated with the mapping platform 103, the services platform 113, the services 115, the probe database 119, the geographic database 121, and/or the vehicles 101. In another embodiment, the content providers 117 may manage access to a central repository of data, and offer a consistent, standard interface to data, such as a repository of the probe database 119 and/or the geographic database 121.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the mapping platform 103 to generate/break vehicle paths on a limited graph area.

In one embodiment, as mentioned above, the vehicles 101, for instance, are part of a probe-based system for collecting probe data and/or sensor data for detecting traffic incidents (e.g., "detour" features such as road closures, traffic accidents, congestion, etc.) and/or measuring traffic conditions in a road network. In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 105 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the mapping platform 103. The probe points also can be map matched to specific road links stored in the geographic database 121. In one embodiment, the system 100 (e.g., via the mapping platform 103) can generate probe traces (e.g., vehicle paths or trajectories) from the observed and expected frequency of probe points for an individual probe so that the probe traces represent a travel trajectory or vehicle path of the probe through the road network as well as likely entrances and exits of the road network.

In one embodiment, as previously stated, the vehicles 101 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe database 119) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travel through road segments of a road network.

Other examples of sensors 105 of the vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel, moisture sensors, pressure sensors, etc. In a further example embodiment, sensors 105 about the perimeter of the vehicle 101 may detect the relative distance of the vehicle 101 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, the vehicles 101 may include GPS or other satellite-based receivers 105 to obtain geographic coordinates from satellites 123 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, other vehicles, conditions regarding the driving environment or roadway, etc. For example, such sensors may be used as GPS receivers for interacting with the one or more satellites 123 to determine and track the current speed, position and location of a vehicle 101 travelling along a link or roadway. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the mapping platform 103 retrieves aggregated probe points gathered and/or generated by the vehicle sensors 105 and/or the UE 109 resulting from the travel of the UEs 109 and/or vehicles 101 on a road segment of a road network. In one instance, the probe database 119 stores a plurality of probe points and/or trajectories generated by different vehicle sensors 105, UEs 109, applications 111, vehicles 101, etc. over a period while traveling in a monitored area. A time sequence of probe points specifies a trajectory—i.e., a path traversed by a UE 109, application 111, vehicle 101, etc. over the period. In one instance, as the time between data points increases, so does the distance and the possible routes/paths between those two points.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, mapping platform 103, vehicle sensors 105, UEs 109, applications 111, services platform 113, services 115, content providers 117, and/or satellites 123 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
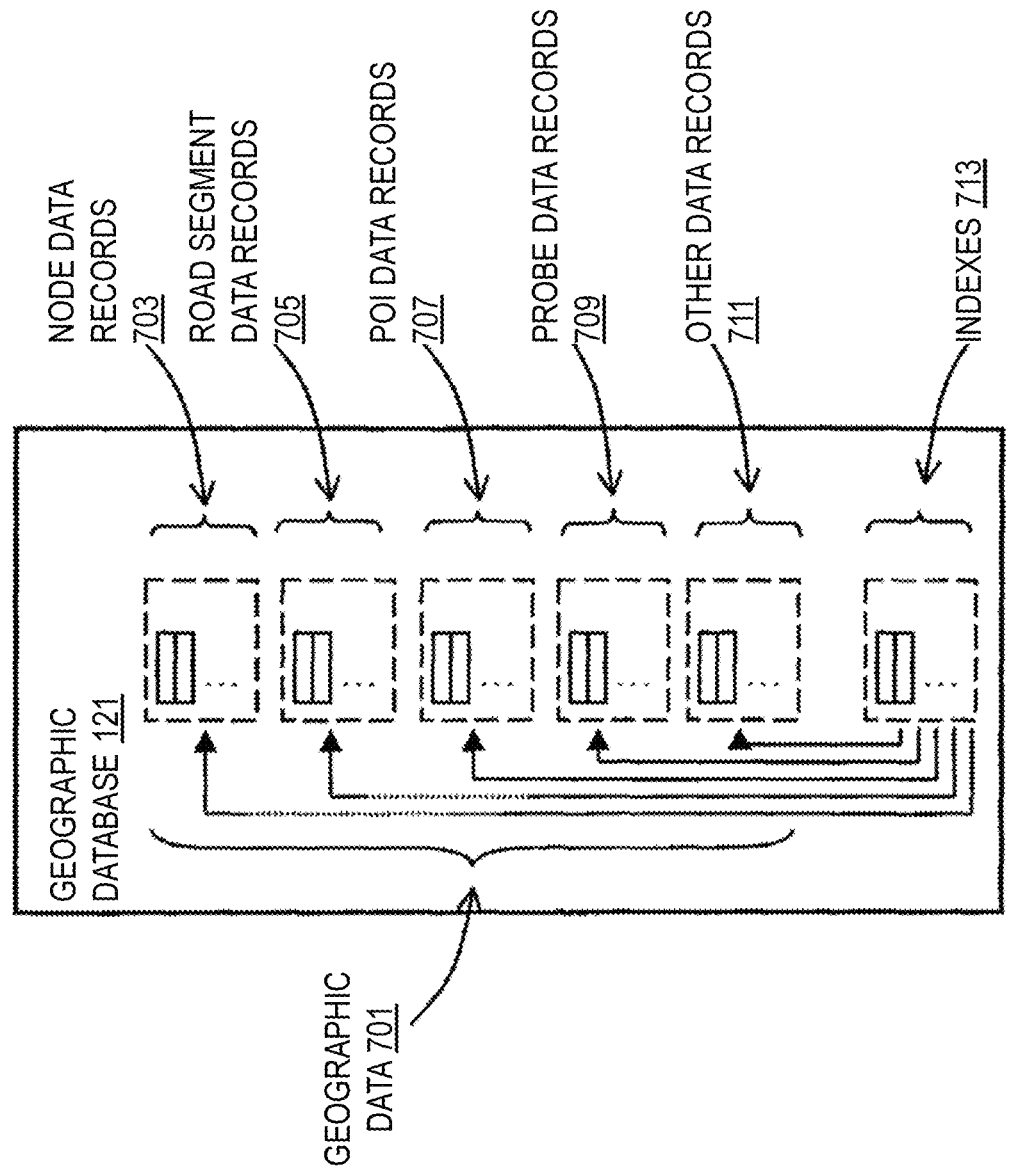
FIG. 7 is a diagram of a geographic database, according to one embodiment.

FIG. 7 is a diagram of a geographic database, according to one embodiment. In exemplary embodiments, location data (e.g., probe data and/or sensor data) can be stored, associated with, and/or linked to the geographic database 121 or data thereof. In one embodiment, the geographic database 121 includes geographic data 701 used for (or configured to be compiled to be used for) mapping and/or navigation-related services, such as for personalized route determination, according to one embodiment. For example, the geographic database 121 includes node data records 703, road segment or link data records 705, POI data records 707, probe data records 709, other data records 711, and indexes 713. More, fewer or different data records can be provided. In one embodiment, the other data records 711 include cartographic ("carto") data records, routing data, and maneuver data. In one embodiment, the probe data (e.g., collected from vehicles 101) can be map-matched to respective map or geographic records via position or GPS data associations (such as using known or future map matching or geo-coding techniques), for example. In one embodiment, the indexes 713 may improve the speed of data retrieval operations in the geographic database 121. The indexes 713 may be used to quickly locate data without having to search every row in the geographic database 121 every time it is accessed.

In various embodiments, the road segment data records 705 are links or segments representing roads, streets, paths, or lanes within multi-lane roads/streets/paths as can be used in the calculated route or recorded route information for determination of one or more personalized routes, according to exemplary embodiments. The node data records 703 are end points corresponding to the respective links or segments of the road segment data records 705. The road segment data records 705 and the node data records 703 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, lane number, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 707. The geographic database 121 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position within a city).

In one embodiment, the geographic database 121 can include probe data collected from vehicles 101 (e.g., probe vehicles). As previously discussed, the probe data include probe points collected from the vehicles 101 and include telemetry data from the vehicles 101 that can be used to detect/identify whether a vehicle 101 has likely exited and/or entered a roadway graph and use this information to inform pathing algorithms as well as to indicate traffic conditions along the roadway from which the probe data was collected. In one embodiment, the probe data can be map-matched to the road network or roadways stored in the probe database 119, the geographic database 121, or a combination thereof. By way of example, the map-matching can be performed by matching the geographic coordinates (e.g., longitude and latitude) recorded for a probe-point against a roadway corresponding to the coordinates.

The geographic database 121 can be maintained by a content provider 117 in association with the services platform 113 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In one embodiment, the data can include path break points and/or detour events (e.g., a road closure) which can then be designated as ground truths for training a machine learning classifier to detect road closures and verify their location from probe data. Different sources of the data points can be treated differently. For example, data points from municipal sources and field personnel can be treated as ground truths, while crowd-sourced data points originating from the general public may be excluded as ground truths.

The geographic database 121 can be a master geographic database stored in a format that facilitates updating, maintenance, and development. For example, the master geographic database 121 or data in the master geographic database 121 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a UE 109, for example. The navigation-related functions can correspond to vehicle navigation, pedestrian navigation, or other types of navigation. The compilation of the mapping and/or probe data to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 121 can be a master geographic database, but in alternate embodiments, the geographic database 121 can represent a compiled navigation database that can be used in or with end user devices (e.g., UEs 109) to provide navigation-related functions. For example, the geographic database 121 can be used with the end user device UE 109 to provide an end user with navigation features. In such a case, the geographic database 121 can be downloaded or stored on the end user device UE 109, such as in applications 111, or the end user device UE 109 can access the geographic database 121 through a wireless or wired connection (such as via a server and/or the communication network 107), for example.

The processes described herein for generating/breaking vehicle paths on a limited graph area may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
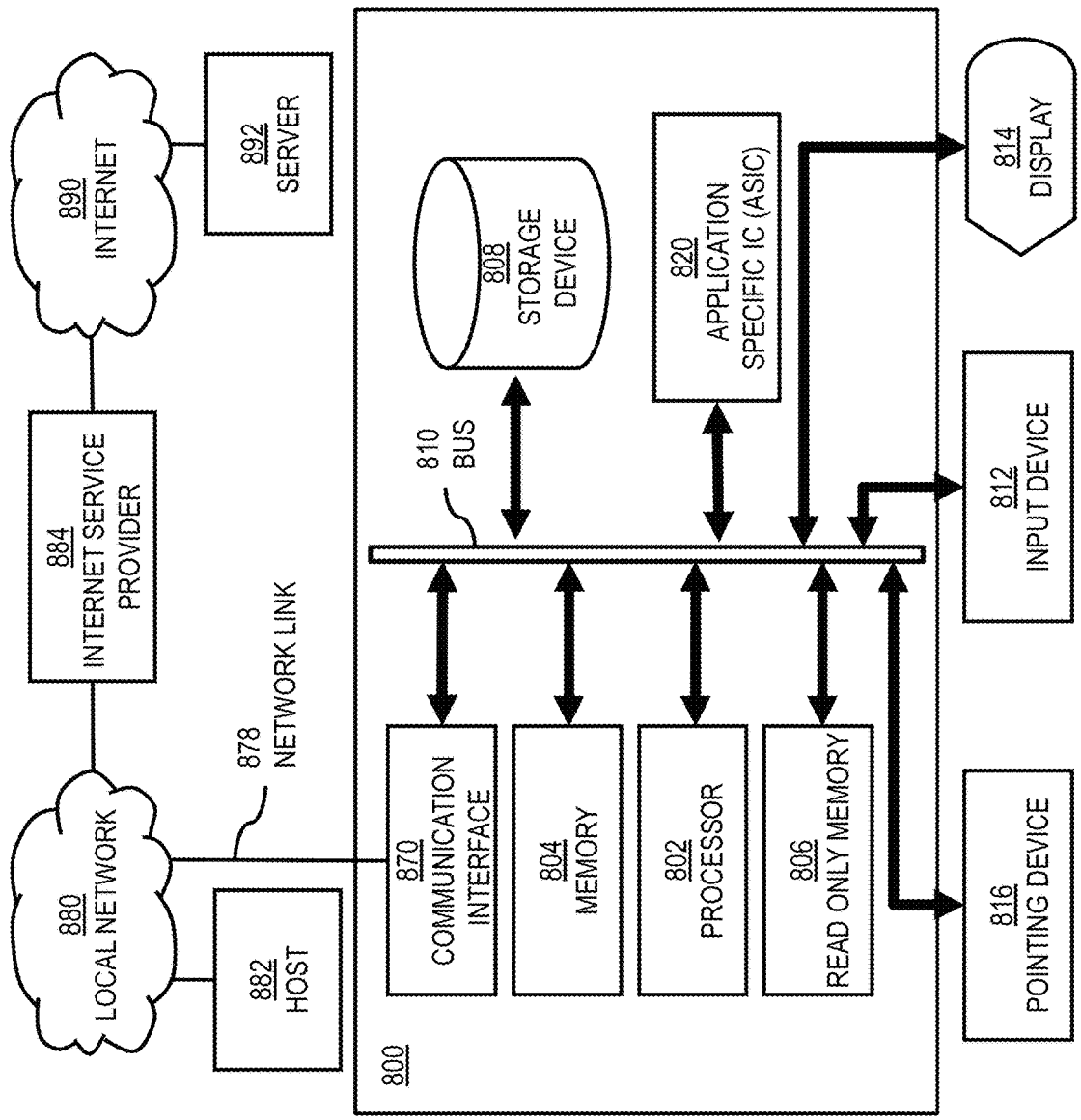
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to generate/break vehicle paths on a limited graph area as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to generating/breaking vehicle paths on a limited graph area. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for generating/breaking vehicle paths on a limited graph area. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for generating/breaking vehicle paths on a limited graph area, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 107 for generating/breaking vehicle paths on a limited graph area.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to generate/break vehicle paths on a limited graph area as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to generate/break vehicle paths on a limited graph area. The memory 905 also stores the data associated with or generated by the execution of the inventive steps.

Figure 10:
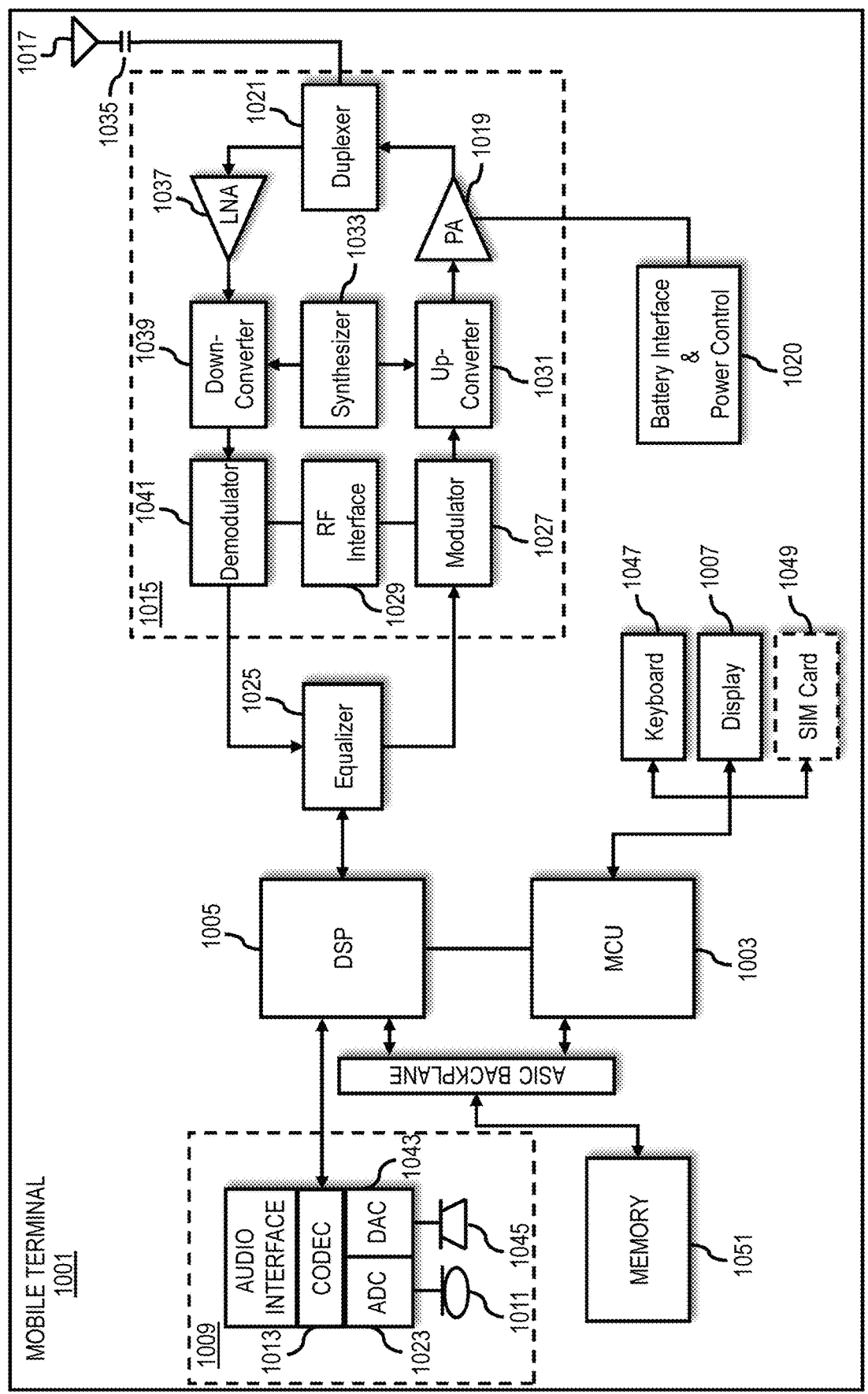
FIG. 10 is a diagram of a mobile terminal (e.g., handset or vehicle or part thereof) that can be used to implement an embodiment.

FIG. 10 is a diagram of exemplary components of a mobile terminal 1001 (e.g., a vehicle 101, a UE 109, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the backend encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to generate/break vehicle paths on a limited graph area. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet.

The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method implemented on one or more processors, the method comprising:
    determining an expected frequency of location data collected from a sensor of a vehicle traveling on a roadway on a limited graph network, wherein the location data include a plurality of probe points that are time-sequenced, and the expected frequency is based on historic traffic flow of a road segment on the limited roadway network;
    detecting an exit or an entry of the vehicle on the roadway based on comparing the expected frequency to an observed frequency of the location data on at least one portion of the roadway;
    creating or breaking a path constructed from the location data based on the detecting of the exit or the entry of the vehicle, wherein the location data is not collected when the vehicle is off the roadway on the limited graph network; and
    providing the path as an output.

2. The method of claim 1, wherein the expected frequency is based on the historical traffic flow of a designated portion of the plurality of probe points.

3. The method of claim 1, wherein the path indicates one or more road segments of the roadway predicted to have been traveled by the vehicle.

4. The method of claim 1, further comprising:
    determining that the vehicle has exited the roadway for the at least one portion of the roadway based on determining that the observed frequency is less than the expected frequency by more than a specified value.

5. The method of claim 1, further comprising:
    creating a break in the path based on determining that the observed frequency is less than the expected frequency by more than a specified value,
    wherein the break is created to span the at least one portion of the roadway.

6. The method of claim 5, further comprising:
    constructing a new path based on the location data occurring on a limited graph network after the break.

7. The method of claim 5, further comprising:
    determining that the vehicle has taken a detour, that a road segment of the roadway has been closed, or a combination thereof based on the break.

8. The method of claim 5, further comprising:
    removing one or more road segments comprising the at least one portion of the roadway from consideration to construct the path.

9. The method of claim 8, wherein a break in the path is constructed to span the at least one portion of the roadway.

10. The method of claim 1, further comprising:
    determining that the vehicle has entered or re-entered the roadway for the at least one portion of the roadway based on determining that the observed frequency is equal to the expected frequency within a specified margin.

11. An apparatus comprising:
    at least one processor; and
    at least one memory including computer program code for one or more programs,
    the at least one memory and the computer program code configured to, with the at least one processor, cause the apparatus to perform at least the following:
        determine an expected frequency of location data collected from a sensor of a vehicle traveling on a roadway on a limited graph network, wherein the location data include a plurality of probe points that are time-sequenced, and the expected frequency is based on historic traffic flow of a road segment on the limited roadway network;
        detect an exit or an entry of the vehicle on the limited roadway network based on comparing the expected frequency to an observed frequency of the location data on at least one portion of the roadway;
        creating or breaking a path constructed from the location data based on the detecting of the exit or the entry of the vehicle, wherein the location data is not collected when the vehicle is off the roadway on the limited graph network; and
        provide the path as an output.

12. The apparatus of claim 11, wherein the expected frequency is based on the historic traffic flow of a designated portion of the plurality of probe points.

13. The apparatus of claim 11, wherein the path indicates one or more road segments of the roadway predicted to have been traveled by the vehicle.

14. The apparatus of claim 11, wherein the apparatus is further caused to:
    determine that the vehicle has exited the roadway for the at least one portion of the roadway based on determining that the observed frequency is less than the expected frequency by more than a specified value.

15. The apparatus of claim 11, wherein the apparatus is further caused to:
    create a break in the path based on determining that the observed frequency is less than the expected frequency by more than a specified value,
        wherein the break is created to span the at least one portion of the roadway.

16. The apparatus of claim 15, wherein the apparatus is further caused to:
    construct a new path based on the location data occurring on the limited road network after the break.

17. The apparatus of claim 15, wherein the apparatus is further caused to:
  determine that the vehicle has taken a detour, that a road segment of the roadway has been closed, or a combination thereof based on the break.

18. A non-transitory computer-readable storage medium, carrying one or more sequences of one or more instructions which, when executed by one or more processors, cause an apparatus to at least perform the following steps:
  determining an expected frequency of location data collected from a sensor of a vehicle traveling on a roadway on a limited graph network, wherein the location data include a plurality of probe points that are time-sequenced, and the expected frequency is based on historic traffic flow of a road segment on the limited roadway network;
  detecting an exit or an entry of the vehicle on the roadway based on comparing the expected frequency to an observed frequency of the location data on at least one portion of the roadway;
  creating a break in a path constructed from the location data based on determining that the observed frequency is less than the expected frequency by more than a specified value,
  wherein the break is created to span the at least one portion of the roadway, and wherein the location data is not collected when the vehicle is off the roadway on the limited graph network; and
  providing the path as an output.

19. The non-transitory computer-readable storage medium of claim 18, wherein the expected frequency is based on the historical traffic flow of a designated portion of the plurality of probe points.

20. The non-transitory computer-readable storage medium of claim 18, wherein the path indicates one or more road segments of the roadway predicted to have been traveled by the vehicle.

* * * * *